US009155991B2

(12) United States Patent
Ogawa et al.

(10) Patent No.: US 9,155,991 B2
(45) Date of Patent: Oct. 13, 2015

(54) CARBON DIOXIDE RECOVERY APPARATUS AND CARBON DIOXIDE RECOVERY METHOD

(75) Inventors: Takashi Ogawa, Yokohama (JP); Yukio Ohashi, Yokohama (JP); Hideo Kitamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 13/298,063

(22) Filed: Nov. 16, 2011

(65) Prior Publication Data

US 2012/0118162 A1 May 17, 2012

(30) Foreign Application Priority Data

Nov. 17, 2010 (JP) ................................. 2010-256969

(51) Int. Cl.
*B01D 53/14* (2006.01)
(52) U.S. Cl.
CPC ........ *B01D 53/1475* (2013.01); *B01D 2259/65* (2013.01); *Y02C 10/06* (2013.01)
(58) Field of Classification Search
USPC .............. 96/234, 242; 95/236, 173, 174, 183, 95/192, 193, 208, 209
See application file for complete search history.

(56) References Cited

U.S. PATENT DOCUMENTS

| 2006/0032377 | A1 | 2/2006 | Reddy et al. | |
| 2007/0283813 | A1* | 12/2007 | Iijima et al. | ...................... 96/235 |
| 2010/0229723 | A1* | 9/2010 | Gelowitz et al. | ................ 95/162 |

FOREIGN PATENT DOCUMENTS

| AU | 2010200175 | * | 11/2010 | ......... B01D 53/1412 |
| AU | 2010200175 | B1 * | 11/2010 | ............. B01D 53/14 |
| JP | H06091134 | A | 4/1994 | |
| JP | H09150029 | A | 6/1997 | |
| JP | 2005254212 | A | 9/2005 | |
| JP | 2007527790 | A | 10/2007 | |
| JP | 2009-214089 | | 9/2009 | |
| JP | 2010120013 | A | 6/2010 | |
| JP | 2010527774 | A | 8/2010 | |
| JP | 2010240629 | A | 10/2010 | |
| WO | 2005087349 | A1 | 9/2005 | |
| WO | 2008144918 | A1 | 12/2008 | |

(Continued)

OTHER PUBLICATIONS

European Search Report dated Mar. 6, 2012, filed in European counterpart Application No. 11188938.2-2113, 5 pages.

(Continued)

*Primary Examiner* — Duane Smith
*Assistant Examiner* — Cabrena Holecek
(74) *Attorney, Agent, or Firm* — Patterson & Sheridan, LLP

(57) ABSTRACT

The present invention provides a carbon dioxide recovery apparatus capable of recovering heat energy of carbon-dioxide-containing gas which includes an absorbing tower to generate and discharge a rich liquid absorbing carbon dioxide as carbon-dioxide-containing gas is introduced and contacted to an absorbing liquid to absorb carbon dioxide, carbon dioxide release devices to discharge semi-lean liquids which have steam containing a part of carbon dioxide released by heating the rich liquid discharged from the absorbing tower, and a regeneration tower to generate a lean liquid which has steam containing remaining carbon dioxide released and separated by heating the semi-lean liquids discharged from the carbon dioxide release devices and to return the lean liquid to the absorbing tower.

40 Claims, 8 Drawing Sheets

(56) References Cited

FOREIGN PATENT DOCUMENTS

| WO | WO-2009/112518 | 9/2009 | |
| WO | WO 2009112518 A1 * | 9/2009 | ............. B01D 53/14 |

OTHER PUBLICATIONS

Canadian Office Action dated Nov. 21, 2012, filed in Canadian couterpart Application No. 2,757,781 (3 pages).
Chinese Office Action dated Nov. 1, 2013, filed in Chinese counterpart Application No. 201110365128.4, 14 pages.
Japanese Office Action dated Jan. 31, 2014, filed in Japanese counterpart Application No. 2010-256969, 8 pages (with translation).
Australian Office Action dated Jan. 23, 2014, filed in Australian counterpart Application No. 2011250763, 3 pages.
Japanese Office Action dated Nov. 21, 2014, filed in Japanese counterpart Application No. 2010-256969, 4 pages (with translation).
Michael H. Sheilan et al., Amine Treating and Sour Water Stripping, Amine Experts, Fourth Printing 2007, 7 pages.
Arthur Kohl et al., Gas Purification, Fifth Edition, Gulf Publishing Company, Houston, Texas, 1997, 4 pages.
T. Yokoyama et al., Evacuation of chemical absorption process for $CO_2$ removal from the flue grases of LNG-fired power plant, Performance of MEA process and feasbility study for LNG-fired power plant, 74 pages.

* cited by examiner

CARBON DIOXIDE RECOVERY APPARATUS AND CARBON DIOXIDE RECOVERY METHOD

CROSS REFERENCE TO RELATED APPLICATION

This application is based upon and claims benefit of priority under 35 USC 119 from the Japanese Patent Application No. 2010-256969, filed on Nov. 17, 2010, the entire contents of which are incorporated herein by reference.

BACKGROUND OF THE INVENTION

1. Field of the Invention

The present invention relates to a carbon dioxide recovery apparatus and a carbon dioxide recovery method.

2. Related Art

Recently, carbon dioxide recovery-storage technologies have received attention as effective countermeasures against global warming issues on fears of a global mass scale for recovering carbon dioxide. In particular, methods to recover carbon dioxide utilizing aqueous solutions have been studied as targeting thermal power stations and process exhaust gas.

Such a carbon dioxide recovery apparatus has been disclosed in Japanese Patent Application Laid-open 2009-214089, for example. The carbon dioxide recovery apparatus includes an absorbing tower which generates a rich liquid by absorbing carbon-dioxide-containing gas into an absorbing liquid, a releasing tower which generates a lean liquid by heating the rich liquid discharged from the absorbing tower to release and separate carbon dioxide along with steam and which returns the lean liquid to the absorbing tower, a first heat exchanger through which the lean liquid to be supplied from the releasing tower to the absorbing tower passes, a second heat exchanger through which carbon-dioxide-containing steam separated at the releasing tower passes, and a splitting device which splits the rich liquid discharged from the absorbing tower to the first and second heat exchangers. Here, the rich liquids introduced to the first and second heat exchangers are supplied to the releasing tower after performing heat exchange respectively with the lean liquid and the carbon-dioxide-containing steam.

With the above carbon dioxide recovery apparatus in the related art, heat energy included in the carbon-dioxide-containing steam which is separated at the releasing tower can be recovered at the second heat exchanger utilizing the split rich liquid. However, temperature of the rich liquid passing through the first heat exchanger is apt to be increased owing to decrease of flow quantity thereof. As a result, since temperature difference against the lean liquid being high temperature side fluid becomes small, there arises a problem that heat energy recovery quantity from the lean liquid at the portion is decreased compared to a case without splitting. The tendency becomes more apparent in a case that performance of the first heat exchanger is enhanced as taking measures such as increasing of heat-transfer area to reduce steam consumption of the carbon dioxide recovery apparatus.

SUMMARY OF THE INVENTION

To address the above issues, the present invention provides a carbon dioxide recovery apparatus and a carbon dioxide recovery method capable of performing effective heat recovery from a lean liquid and carbon-dioxide-containing steam with a rich liquid.

According to one aspect of the present invention, there is provided a carbon dioxide recovery apparatus, comprising: an absorbing tower to generate and discharge a rich liquid absorbing carbon dioxide as carbon-dioxide-containing gas is introduced and contacted to an absorbing liquid to absorb carbon dioxide; a carbon dioxide release device to discharge a semi-lean liquid which has steam containing a part of carbon dioxide released by heating the rich liquid discharged from the absorbing tower; and a regeneration tower to generate a lean liquid which has steam containing remaining carbon dioxide released and separated by heating the semi-lean liquid discharged from the carbon dioxide release device and to return the lean liquid to the absorbing tower.

Further, according to one aspect of the present invention, there is provided a carbon dioxide recovery method, comprising: generating and discharging a rich liquid which absorbs carbon dioxide as introducing carbon-dioxide-containing gas and contacting the gas to an absorbing liquid to absorb carbon dioxide; discharging a semi-lean liquid which has steam containing a part of carbon dioxide released by heating the rich liquid; and generating a lean liquid which has steam containing remaining carbon dioxide released and separated by heating the semi-lean liquid.

According to the carbon dioxide recovery apparatus and the carbon dioxide recovery method of the present invention, it is possible to perform effective heat recovery from the lean liquid and the carbon-dioxide-containing steam with the rich liquid.

DETAILED DESCRIPTION OF THE EMBODIMENTS

Hereafter, carbon dioxide recovery apparatuses and carbon dioxide recovery methods according to first to seventh embodiments of the present invention will be described with reference to the drawings.

(First Embodiment)

Figure 1:
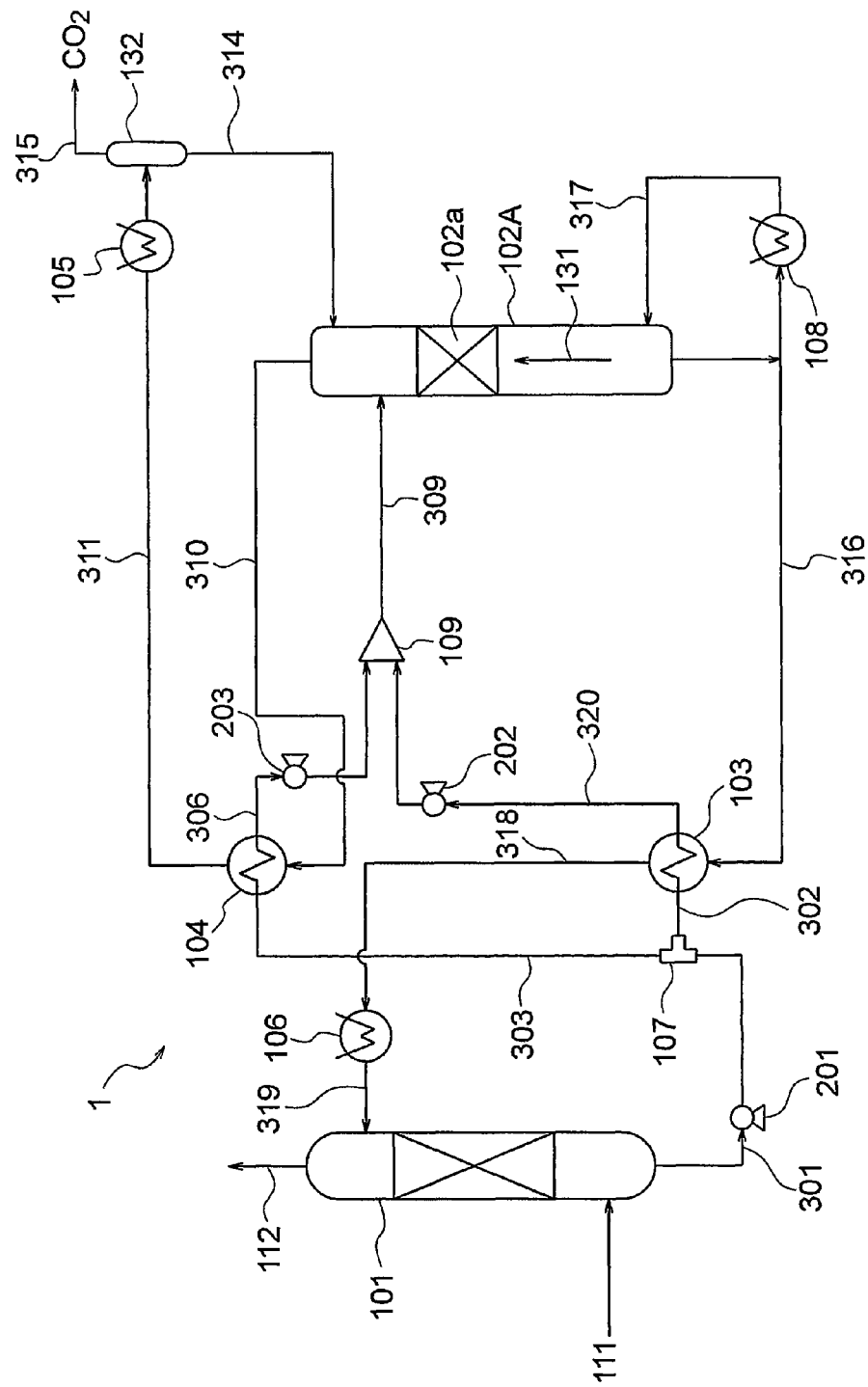
FIG. 1 is a layout view illustrating a structure of a carbon dioxide recovery apparatus 1 according to a first embodiment of the present invention.

A carbon dioxide recovery apparatus according to the first embodiment of the present invention will be described with reference to FIG. 1 which illustrates the structure thereof.

The carbon dioxide recovery apparatus 1 according to the first embodiment is provided with an absorbing tower 101, carbon dioxide release devices 103, 104, a gas-liquid separator 132, coolers 105, 106, a regeneration tower 102A and a re-boiler 108 as main structural elements.

Further, the carbon dioxide recovery apparatus 1 is provided with pumps 201, 202, 203, a splitting device 107 and a merging device 109.

In the absorbing tower 101, a rich liquid 301 having carbon dioxide absorbed is generated while carbon-dioxide-containing gas 111 is introduced and contacted to an absorbing liquid which absorbs carbon dioxide.

The absorbing tower 101, for example, being constituted with a counter flow type gas-liquid contacting device is structured to perform gas-liquid contacting between the carbon-dioxide-containing gas 111 supplied from a lower part and a lean liquid 319 flowing down from an upper part.

Not being particularly limited, the carbon-dioxide-containing gas 111 to be supplied to the absorbing tower 101 may be, for example, combustion exhaust gas, process exhaust gas and the like and may be introduced after receiving a cooling process if required.

Further, not being particularly limited, the absorbing liquid may adopt aqueous solution of amine series such as monoethanol-amine (MEA) and diethanol-amine (DEA), for example. Carbon-dioxide-removed gas 112 having carbon dioxide removed is discharged from an upper part of the absorbing tower 101.

The rich liquid 301 discharged from the absorbing tower 101 is supplied to the splitting device 107 via the pump 201 and is split into rich liquids 302, 303 at a desired flow ratio.

The rich liquids 302, 303 are heated respectively at the carbon dioxide release devices 103, 104 having a part of carbon dioxide released along with steam and are discharged as being gas-liquid two-phase semi-lean liquids 320, 306 having a part of carbon dioxide removed.

Here, a lean liquid 316 to be supplied from the regeneration tower 102A to the absorbing tower 101 passes through the carbon dioxide release device 103 being a first carbon dioxide release device.

As described later, carbon-dioxide-containing steam 310 separated at the regeneration tower 102A passes through the carbon dioxide release device 104 being a second carbon dioxide release device.

Accordingly, the rich liquids 302, 303 supplied respectively to the carbon dioxide release devices 103, 104 are heated owing to heat exchange with the lean liquid 316 and the carbon-dioxide-containing steam 310, so that a part of carbon dioxide is released along with steam.

Carbon-dioxide-containing steam 311 having a part of water vapor condensed at the carbon dioxide release device 104 is discharged and supplied to the cooler 105 and is discharged to the gas-liquid separator 132 after being cooled owing to refrigerant such as cold water to be supplied from the outside, and then, is discharged from the gas-liquid separator 132 as being separated into carbon dioxide 315 and condensed water 314.

The semi-lean liquids 320, 306 having a part of carbon dioxide released are merged at the merging device 109 respectively via the pumps 202, 203, and then, are supplied to the regeneration tower 102A.

The regeneration tower 102A including a loading layer 102a heats the semi-lean liquid 309. Accordingly, the most part of carbon dioxide is separated as being released along with steam and is discharged from an upper part thereof as the carbon-dioxide-containing steam 310. The lean liquid 316 having the most part of carbon dioxide removed is returned to the absorbing tower 101.

The regeneration tower 102A is a counter flow type gas-liquid contacting device, for example. Here, heating of a stored liquid is performed at the re-boiler 108 by performing heat-exchange with high temperature steam which is external supply heat.

The cooler 106 is provided between the carbon dioxide release device 103 and the absorbing tower 101 on a route through which the lean liquid 316 is supplied from the regeneration tower 102A to the absorbing tower 101. A lean liquid 318 is cooled owing to refrigerant such as cold water to be supplied from the outside, and then, is returned to the absorbing tower 101 as a lean liquid 319.

According to the carbon dioxide recovery apparatus 1 of the first embodiment having the above configuration, following operation and effects can be obtained.

First, an absorbing process of carbon dioxide, in which the rich liquid 301 is generated as the carbon-dioxide-containing gas 111 is absorbed to the absorbing liquid, is performed at the absorbing tower 101.

The rich liquid 301 discharged from the absorbing tower 101 is split and is supplied to the regeneration tower 102A as the gas-liquid two-phase semi-lean liquids 320, 306 having a part of carbon dioxide released respectively at the carbon dioxide release devices 103, 104. Subsequently, circulation supplying is performed as the carbon-dioxide-containing steam 131 as being heated by the re-boiler 108, and then, remaining carbon-dioxide-containing steam is released.

The carbon-dioxide-containing steam is discharged from the upper part of the regeneration tower 102A as the carbon-dioxide-containing steam 310 while the lean liquid 316 is returned to the absorbing tower 101.

In this manner, a rejuvenating process for energy reutilization is performed until the rich liquid 301 absorbing carbon dioxide becomes the lean liquid 316.

In the rejuvenating process, the lean liquid 316 discharged from the regeneration tower 102A is supplied to the absorbing tower 101 as passing through the carbon dioxide release device 103 and the cooler 106. Meanwhile, the carbon-dioxide-containing steam 310 separated at the regeneration tower 102A is supplied to the gas-liquid separator 132 as passing through the carbon dioxide release device 104 and the cooler 105.

The rich liquid 301 discharged from the absorbing tower 101 is introduced to the carbon dioxide release devices 103, 104 as being split at the splitting device 107, and then, is supplied to the regeneration tower 102A after performing heat exchange respectively with the lean liquid 316 and the carbon-dioxide-containing steam 310.

Temperature of the semi-lean liquids 320, 306 to be introduced to the regeneration tower 102A can be sufficiently raised by utilizing the two carbon dioxide release devices 103, 104, while a part of carbon dioxide is released. Here, the releasing of carbon dioxide and water evaporation corresponding thereto are endothermal reactions. Therefore, temperature difference between the rich liquid and the lean liquid in the carbon dioxide release device 103 or temperature difference between the rich liquid and the carbon-dioxide-containing steam in the carbon dioxide release device 104 can be enlarged compared to a case that the rich liquid does not change in phase. Accordingly, heat recovery utilizing the rich liquid from the lean liquid and the carbon-dioxide-containing steam can be performed more effectively.

Further, by setting pressure in the carbon dioxide release devices 103, 104 to be low, the semi-lean liquids 320, 306 can be easily varied into two phases as being liquid and carbon-dioxide-containing steam. Since the degree of being two phases and efficiency of heat recovery can be increased, heat energy for releasing carbon dioxide at the regeneration tower 102A can be further reduced.

As a result, temperature of the lean liquid 318 and the carbon-dioxide-containing steam 311 to be introduced respectively to the coolers 106, 105 can be set low. Accordingly, cooling loss can be suppressed by reducing cooling load at the coolers 106, 105.

As described above, according to the first embodiment, it becomes possible to efficiently perform heat recovery with the rich liquid from the lean liquid and the carbon-dioxide-containing steam.

In the first embodiment, the condensed water 314 separated at the gas-liquid separator 132 is to be returned to the regeneration tower 102A. However, the condensed water 314 may be returned to the absorbing tower 101 or may be merged with the lean liquid 318 after the carbon dioxide release device 103. Alternatively, it is also possible to be used for another purpose.

Further, the first embodiment includes the pumps 201 to 203. However, it is not necessarily required to provide all of the pumps. The number thereof can be reduced.

In the first embodiment, the splitting device 107 is provided at the outside of the absorbing tower 101 and the flow passage of the rich liquid 301 is connected to the carbon dioxide release devices 103, 104 via two pipes after being split by the splitting device 107. However, not limited to the above, it is possible to adopt a structure to supply to the carbon dioxide release devices 103, 104 as being split from the absorbing tower 101, and the like as long as the structure is capable of supplying to both of the carbon dioxide release devices 103, 104 at a desired flow ratio.

(Second Embodiment)

Figure 2:
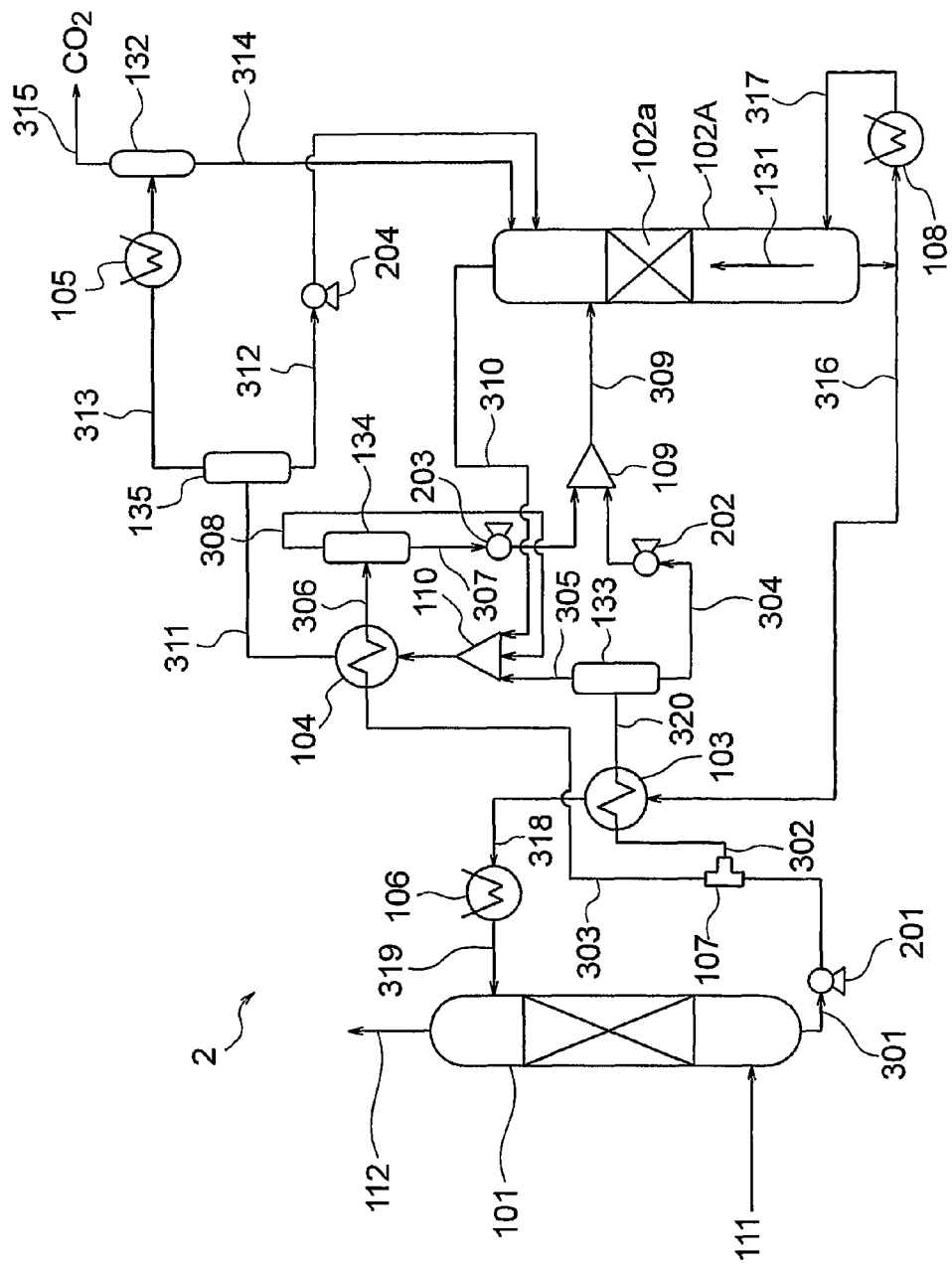
FIG. 2 is a layout view illustrating a structure of a carbon dioxide recovery apparatus 2 according to a second embodiment of the present invention.

A carbon dioxide recovery apparatus 2 according to the second embodiment of the present invention will be described with reference to FIG. 2 which illustrates the structure thereof.

Compared to the carbon dioxide recovery apparatus 1 according to the first embodiment, the carbon dioxide recovery apparatus 2 according to the second embodiment differs in including gas-liquid separators 133, 134, 135 and a merging device 110, and a pump 204.

The rich liquid 301 discharged from the absorbing tower 101 is supplied to the carbon dioxide release devices 103, 104 as the rich liquids 302, 303 via the splitting device 107. The rich liquids 302, 303 are heated respectively having a part of carbon dioxide released along with steam and are discharged as being the gas-liquid two-phase semi-lean liquids 320, 306 having a part of carbon dioxide removed from the liquid.

The lean liquid 316 to be supplied from the regeneration tower 102A to the absorbing tower 101 passes through the carbon dioxide release device 103. The carbon-dioxide-containing steam 310 separated at the regeneration tower 102A passes through the carbon dioxide release device 104 after being merged with carbon-dioxide-containing steam 305, 308 at a merging device 110 as described later.

Accordingly, the rich liquids 302, 303 supplied respectively to the carbon dioxide release devices 103, 104 are heated owing to heat exchange with the lean liquid 316 and the carbon-dioxide-containing steam 305, 308, 310, so that a part of carbon dioxide is released along with steam.

The carbon-dioxide-containing steam 311 having a part of water vapor condensed at the carbon dioxide release device 104 is discharged and supplied to the gas-liquid separator 135, and then, is discharged as being separated into carbon-dioxide-containing steam 313 and condensed water 312. The carbon-dioxide-containing steam 313 is supplied to the cooler 105 and is discharged to the gas-liquid separator 132 as being cooled owing to refrigerant such as cold water to be supplied from the outside, and then, is discharged from the gas-liquid separator 132 after being separated into the carbon dioxide 315 and the condensed water 314. The condensed water 312 discharged from the gas-liquid separator 135 is returned to the regeneration tower 102A via the pump 204 along with the condensed water 314 discharged from the gas-liquid separator 132. Here, it is also possible to supply the carbon-dioxide-containing steam 311 directly to the cooler 105 without providing the gas-liquid separator 135.

The semi-lean liquids 320, 306 discharged from the carbon dioxide release devices 103, 104 are separated into carbon-dioxide-containing steam 305, 308 and semi-lean liquids 304, 307 respectively by the gas-liquid separators 133, 134.

The carbon-dioxide-containing steam 305, 308 are supplied to the merging device 110 to be merged with the carbon-dioxide-containing steam 310 which is discharged from the regeneration tower 102A, and then, is supplied to the carbon dioxide release device 104.

The semi-lean liquids 304, 307 having a part of carbon dioxide released are merged at the merging device 109 respectively via the pumps 202, 203, and then, are supplied to the regeneration tower 102A.

The rest of the structure and operation is the same as that of the first embodiment and description thereof will not be repeated.

In the second embodiment, likewise for the first embodiment, the semi-lean liquids 320, 306 can be easily varied into two phases as being liquid and carbon-dioxide-containing steam by setting the pressure in the carbon dioxide release devices 103, 104 to be low. Accordingly, it becomes possible to perform heat recovery more effectively.

Further, according to the second embodiment, the regeneration tower 102A and the gas-liquid separators 133, 134 are communicated respectively through a gas single phase. Therefore, in a case that distances between the gas-liquid separator 133 and the carbon dioxide release device 103 and between the gas-liquid separator 134 and the carbon dioxide release device 104 are short, pressure loss in pipes is smaller than that of the first embodiment in which the regeneration tower 102A and the carbon dioxide release devices 103, 104 are communicated respectively through a supply line of the gas-liquid two-phase semi-lean liquid. Accordingly, rich liquid pressure in the carbon dioxide release devices 103, 104 can be set low. In addition, since the rich liquid pressure in the carbon dioxide release devices 103, 104 can be set low by the amount of elimination or reduction of liquid phase heads in pipes toward the regeneration tower 102A which are to be noticeable when the carbon dioxide release devices 103, 104 are placed at low positions, the degree of being two phases of the semi-lean liquids 320, 306 can be increased and heat recovery from the lean liquid and the carbon-dioxide-containing steam utilizing the rich liquids can be performed more effectively.

In addition, since the semi-lean liquids 304, 307 are supplied to the regeneration tower 102A after having carbon dioxide separated to some extent owing to the gas-liquid separators 133, 134, it is possible to suppress reabsorption of carbon dioxide at the regeneration tower 102A.

Figure 3:
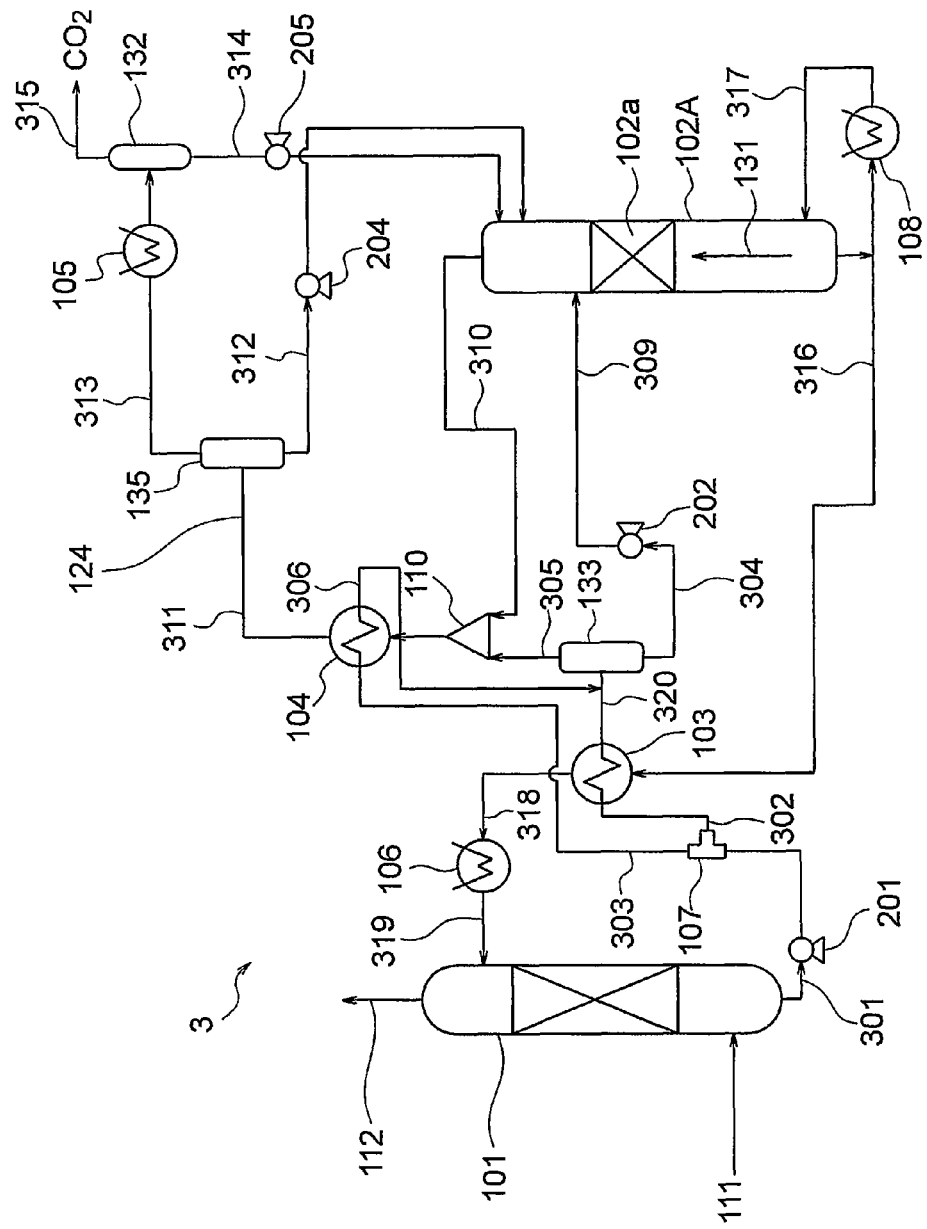
FIG. 3 is a layout view illustrating a modified example of the carbon dioxide recovery apparatus 2 according to the second embodiment of the present invention.

In the second embodiment, it is also possible to adopt a structure in which the semi-lean liquids 320, 306 are introduced to the gas-liquid separator 133 after being merged and the carbon-dioxide-containing steam 305 separated thereat and the carbon-dioxide-containing steam 310 discharged from the regeneration tower 102A are supplied to the carbon dioxide release device 104 after being merged, as illustrated in FIG. 3, for example.

Further, the second embodiment includes the pumps 201 to 204. However, not necessarily required to provide the all, it is also possible to reduce the number thereof by placing the regeneration tower 102A at a low position, and the like.

The rest of the structure and operation is the same as that of the first embodiment and description thereof will not be repeated.

(Third Embodiment)

Figure 4:
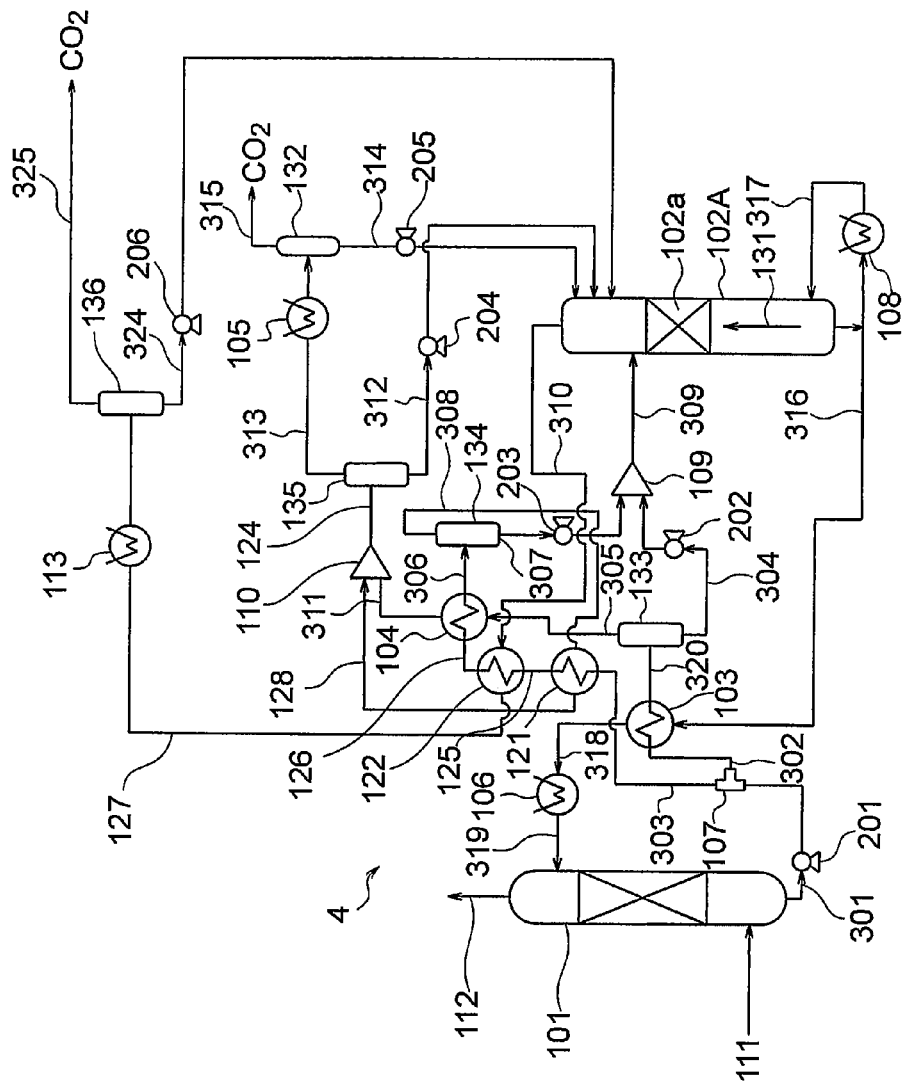
FIG. 4 is a layout view illustrating a structure of a carbon dioxide recovery apparatus 3 according to a third embodiment of the present invention.

A carbon dioxide recovery apparatus 4 according to the third embodiment of the present invention will be described with reference to FIG. 4 which illustrates the structure thereof.

Compared to the carbon dioxide recovery apparatus 2 according to the second embodiment, the carbon dioxide recovery apparatus 4 according to the third embodiment differs in including carbon dioxide release devices 121, 122, a cooler 113, a gas-liquid separator 136 and pumps 205, 206.

The rich liquid 301 discharged from the absorbing tower 101 is supplied to the carbon dioxide release device 103 being the first carbon dioxide release device via the splitting device 107 as the rich liquid 302 and is heated having a part of carbon dioxide released along with steam, and then, is discharged as being the gas-liquid two-phase semi-lean liquid 320 having a part of carbon dioxide removed from the liquid. Meanwhile, the rich liquid 303 is supplied sequentially to the carbon dioxide release devices 121, 122, 104 being the second carbon dioxide release device and is heated thereat respectively having a part of carbon dioxide released along with steam, and then, is discharged as being the gas-liquid two-phase semi-lean liquid 306 having a part of carbon dioxide removed from the liquid.

The lean liquid 316 to be supplied from the regeneration tower 102A to the absorbing tower 101 passes through the carbon dioxide release device 103 and heats the rich liquid 302 owing to heat exchange with the rich liquid 302. Accordingly, a part of carbon dioxide is released along with steam.

The carbon-dioxide-containing steam 308 discharged from the gas-liquid separator 134 passes through the carbon dioxide release device 121. The carbon-dioxide-containing steam 310 separated at the regeneration tower 102A passes through the carbon dioxide release device 122. The carbon-dioxide-containing steam 305 discharged from the gas-liquid separator 133 passes through the carbon dioxide release device 104. Accordingly, the rich liquid 303 sequentially supplied to the carbon dioxide release devices 121, 122, 104 is heated owing to heat exchange respectively with the carbon-dioxide-containing steam 308, 310, 305, so that a part of carbon dioxide is released along with steam.

The carbon-dioxide-containing steam 128, 311 having a part of water vapor condensed at the carbon dioxide release devices 121, 104 is discharged and supplied to the gas-liquid separator 135 as the carbon-dioxide-containing steam 124 after being supplied to and merged at the merging device 110, and then, is discharged as being separated into the carbon-dioxide-containing steam 313 and the condensed water 312. The carbon-dioxide-containing steam 313 is supplied to the cooler 105 and is discharged to the gas-liquid separator 132 as being cooled owing to refrigerant such as cold water to be supplied from the outside, and then, is discharged from the gas-liquid separator 132 after being separated into the carbon dioxide 315 and the condensed water 314. The condensed water 312 discharged from the gas-liquid separator 135 is returned to the regeneration tower 102A via the pump 204 along with the condensed water 314 discharged from the gas-liquid separator 132. Here, it is also possible to supply the carbon-dioxide-containing steam 124 directly to the cooler 105 without providing the gas-liquid separator 135.

Carbon-dioxide-containing steam 127 having a part of water vapor condensed at the carbon dioxide release device 122 is discharged and supplied to the cooler 113 and is discharged to the gas-liquid separator 136 after being cooled owing to refrigerant such as cold water to be supplied from the outside, and then, discharged from the gas-liquid separator 136 as being separated into carbon dioxide 325 and condensed water 324. The condensed water 324 discharged from the gas-liquid separator 136 is returned to the regeneration tower 102A via the pump 206.

The semi-lean liquids 320, 306 discharged from the carbon dioxide release devices 103, 104 are separated into carbon-dioxide-containing steam 305, 308 and semi-lean liquids 304, 307 respectively by the gas-liquid separators 133, 134.

The semi-lean liquids 304, 307 having a part of carbon dioxide released are merged at the merging device 109 respectively via the pumps 202, 203, and then, are supplied to the regeneration tower 102A.

Here, supply lines of the carbon-dioxide-containing steam 305, 308 and a supply line of the carbon-dioxide-containing steam 310 are not merged. Accordingly, being different from the second embodiment, pressure in the gas-liquid separators 133, 134 can be remarkably lowered than pressure in the regeneration tower 102A owing to adjustment of a pressure adjusting valve (not illustrated) provided to a supply line etc. of the carbon dioxide 315. Therefore, since each rich liquid pressure in the carbon dioxide release devices 103, 121, 122, 104 can be lowered, the degree of being two phases of the semi-lean liquids 320, 306 can be increased and heat recovery from the lean liquid and the carbon-dioxide-containing steam utilizing the rich liquids can be performed more effectively.

Here, it is also possible to lower the rich liquid pressure in the carbon dioxide release devices than the pressure in the regeneration tower 102A with a structure in which the semi-lean liquids 320, 306 are introduced to a gas-liquid separator after being merged and carbon-dioxide-containing steam separated thereat and the carbon-dioxide-containing steam 310 discharged from the regeneration tower 102A, without being merged, sequentially heat the rich liquid 303 with separate carbon dioxide release devices.

The rest of the structure and operation is the same as that of the second embodiment and description thereof will not be repeated.

(Fourth Embodiment)

Figure 5:
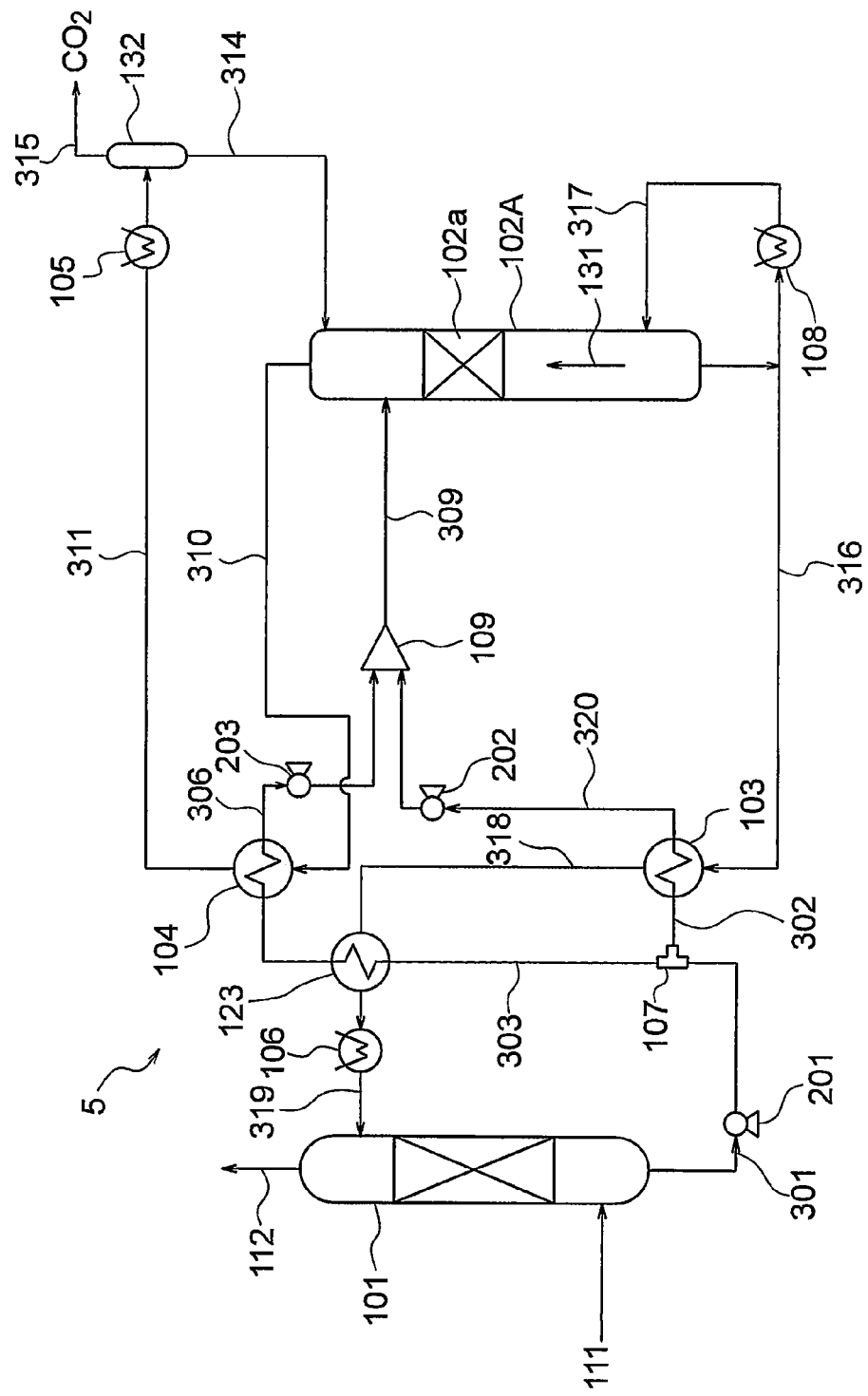
FIG. 5 is a layout view illustrating a structure of a carbon dioxide recovery apparatus 4 according to a fourth embodiment of the present invention.

A carbon dioxide recovery apparatus 5 according to the fourth embodiment of the present invention will be described with reference to FIG. 5 which illustrates the structure thereof.

Compared to the carbon dioxide recovery apparatus 1 according to the first embodiment, the carbon dioxide recovery apparatus 5 according to the fourth embodiment differs in including a lean liquid cooler 123.

At the lean liquid cooler 123 placed before the carbon dioxide release device 104, the rich liquid 303 supplied after being split cools the lean liquid 318 discharged from the carbon dioxide release device 103 as being heated thereat. It is possible to reduce usage quantity of high temperature steam supplied at the re-boiler 108 by performing heat recovery from the lean liquid to a maximum extent. Further, it is also possible to suppress power usage quantity by reducing cooling load at the cooler 106.

The rest of the structure and operation is the same as that of the first embodiment and description thereof will not be repeated.

Naturally, it is also possible to provide the lean liquid cooler 123 to the carbon dioxide recovery apparatus of the second embodiment or the third embodiment. Here, similar effects are obtained.

(Fifth Embodiment)

Figure 6:
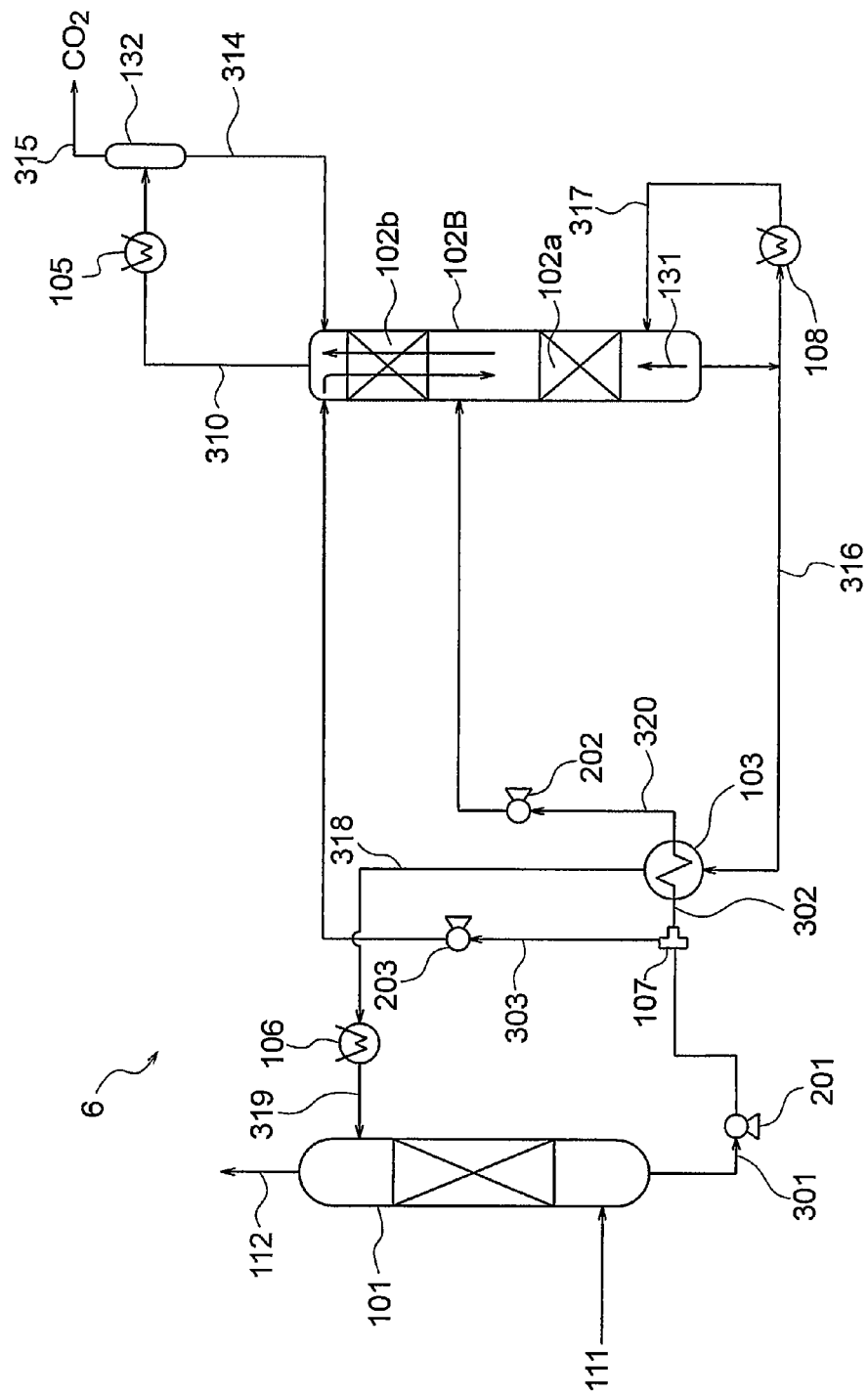
FIG. 6 is a layout view illustrating a structure of a carbon dioxide recovery apparatus 5 according to a fifth embodiment of the present invention.

A carbon dioxide recovery apparatus 6 according to the fifth embodiment of the present invention will be described with reference to FIG. 6 which illustrates the structure thereof.

In the first to fourth embodiments, the carbon dioxide release device 104 is arranged at the outside of the regeneration tower 102A. On the contrary, in the fifth embodiment, the carbon dioxide release device 104 is not arranged at the outside of a regeneration tower 102B. Accordingly, the rich liquid 303 discharged from the splitting device 107 is supplied directly to the regeneration tower 102B. Since the carbon dioxide release device 104 is not arranged at the outside of the regeneration tower 102B, the merging device 109 becomes unnecessary.

Here, heat exchange of the semi-lean liquid 320 and the rich liquid 303 with the carbon-dioxide-containing steam 131 is performed at the inside of the regeneration tower 102B. In the first to fourth embodiments, the regeneration tower 102A is provided simply with the loading layer 102a. In contrast, the regeneration tower 102B of the fifth embodiment is provided with a loading layer 102b at the upper stage as well as with the loading layer 102a at the lower stage. The rich liquid 303 is supplied from above the loading layer 102b at the upper stage and is moved downward as passing through the loading layer 102b. The semi-lean liquid 320 is supplied between the loading layers 102a, 102b and is moved downward as passing through the loading layer 102a at the lower stage. The carbon-dioxide-containing steam 131 passes upwards through the loading layers 102a, 102b, so that heat exchange is performed. That is, instead of the carbon dioxide release device 104, the loading layer 102b having a similar function is arranged in the regeneration tower 102B as the second carbon dioxide release device. Here, the carbon-dioxide-containing steam contained in the semi-lean liquid 320 also functions as a heating medium for the rich liquid 303 along with the carbon-dioxide-containing steam 131 owing to upward movement thereof after being introduced to the regeneration tower 102B.

In the first to fourth embodiments, the carbon-dioxide-containing steam 310 discharged from the upper part of the regeneration tower 102B passes through the carbon dioxide release device 104 and the like. In the fifth embodiment, the carbon-dioxide-containing steam 310 is supplied directly to the cooler 105 and cooled, and is supplied to the gas-liquid separator 132.

According to the fifth embodiment, since the carbon dioxide release device 104 and the merging device 109 are not provided, it is possible to reduce manufacturing cost requiring less pipes compared to the first embodiment. Here, the fifth embodiment includes the pumps 201 to 203. However, it is not necessarily required to provide all of the pumps. The number thereof can be reduced.

(Sixth Embodiment)

Figure 7:
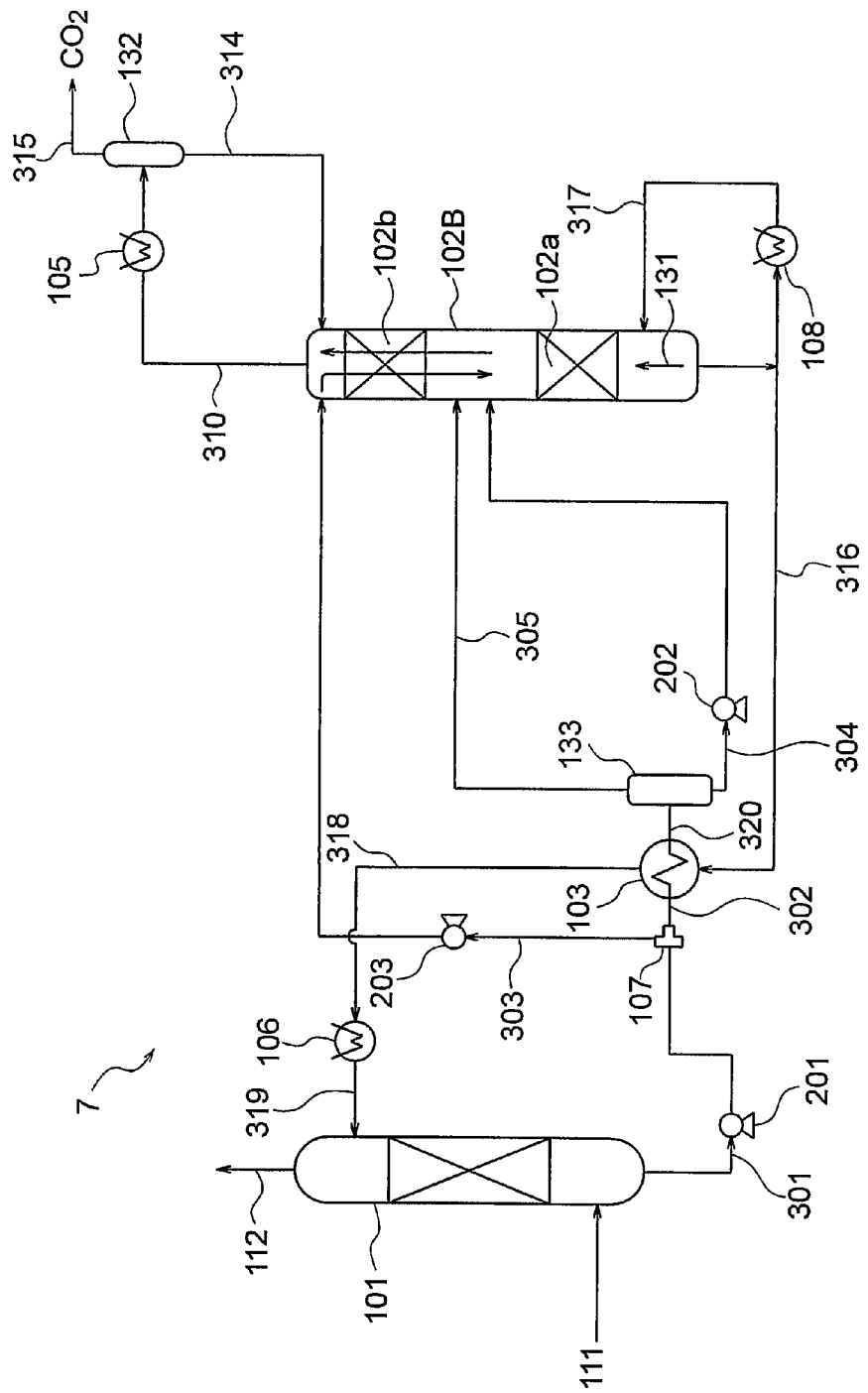
FIG. 7 is a layout view illustrating a structure of a carbon dioxide recovery apparatus 6 according to a sixth embodiment of the present invention.

A carbon dioxide recovery apparatus 7 according to the sixth embodiment of the present invention will be described with reference to FIG. 7 which illustrates the structure thereof.

Compared to the carbon dioxide recovery apparatus 6 according to the fifth embodiment, the carbon dioxide recovery apparatus 7 according to the sixth embodiment differs in including the gas-liquid separator 133.

The semi-lean liquid 320 discharged from the carbon dioxide release device 103 is separated into the carbon-dioxide-containing steam 305 and the semi-lean liquid 304 by the gas-liquid separator 133.

The semi-lean liquid 304 is supplied between the loading layers 102a, 102b by the pump 202 and is moved downward as passing through the loading layer 102a at the lower stage. The carbon-dioxide-containing steam 305 is supplied at a position of the same height as the semi-lean liquid 304 or higher to the regeneration tower 102B and functions as a heating medium for the semi-lean liquid 303 along with the carbon-dioxide-containing steam 131 as being moved upward.

Further, according to the sixth embodiment, the regeneration tower 102B and the gas-liquid separator 133 is communicated through a gas single phase. Therefore, in a case that distance between the gas-liquid separator 133 and the carbon dioxide release device 103 is short, pressure loss in pipes is smaller than that of the fifth embodiment in which the regeneration tower 102B and the carbon dioxide release device 103 are communicated through a supply line of the gas-liquid two-phase semi-lean liquid. Accordingly, rich liquid pressure in the carbon dioxide release device 103 can be set low. In addition, since the rich liquid pressure in the carbon dioxide release device 103 can be set low by the amount of elimination or reduction of a liquid phase head in pipes toward the regeneration tower 102B which is to be noticeable when the carbon dioxide release device 103 is placed at a low position, the degree of being two phases of the semi-lean liquid 320 can be increased and heat recovery from the lean liquid and the carbon-dioxide-containing steam utilizing the rich liquid can be performed more effectively.

The rest of the structure and operation is the same as that of the fifth embodiment and description thereof will not be repeated.

(Seventh Embodiment)

Figure 8:
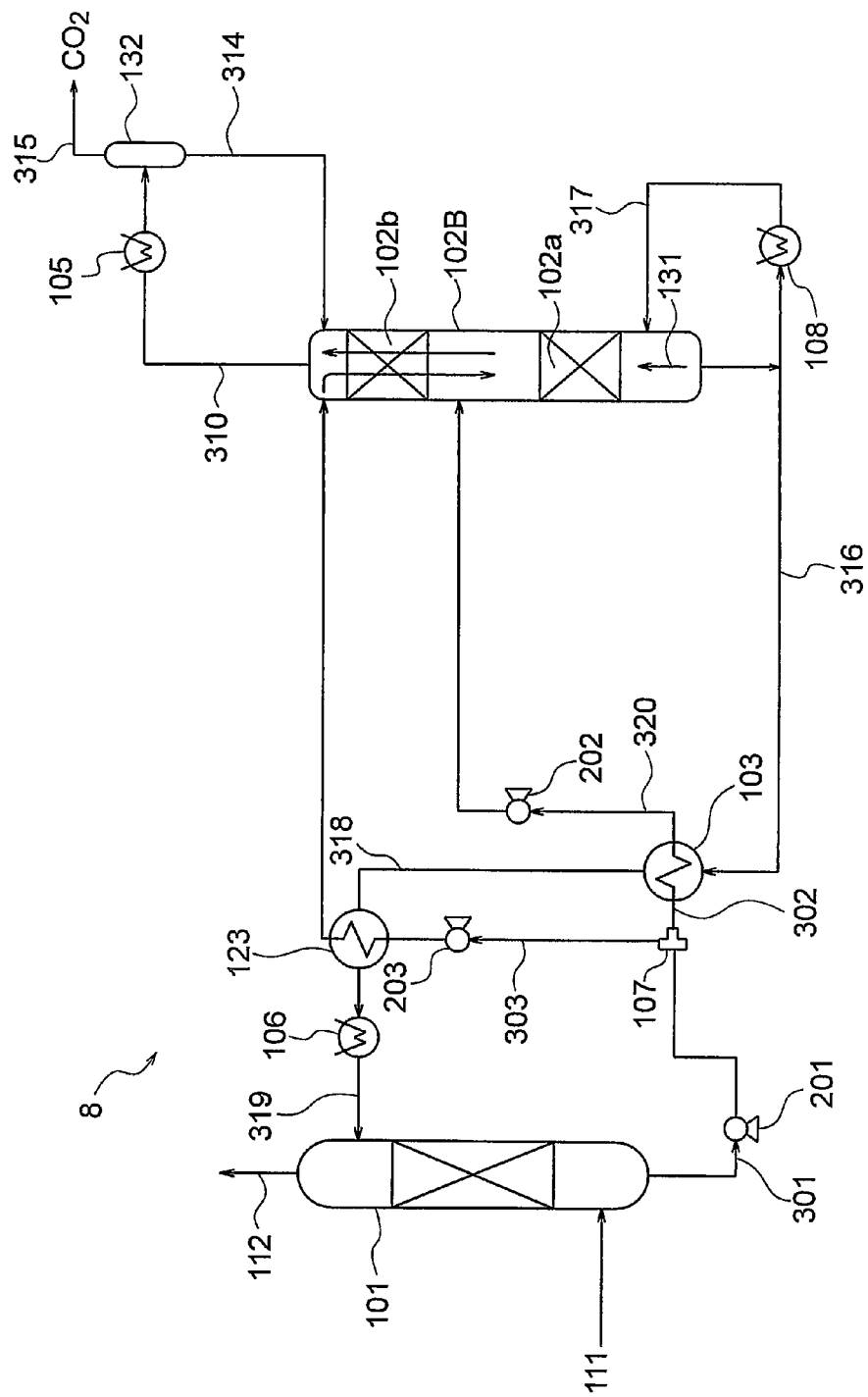
FIG. 8 is a layout view illustrating a structure of a carbon dioxide recovery apparatus 7 according to a seventh embodiment of the present invention.

A carbon dioxide recovery apparatus 8 according to the seventh embodiment of the present invention will be described with reference to FIG. 8 which illustrates the structure thereof.

Compared to the carbon dioxide recovery apparatus 6 according to the fifth embodiment, the carbon dioxide recovery apparatus 8 according to the seventh embodiment differs in including the lean liquid cooler 123.

At the lean liquid cooler 123 placed before the regeneration tower 102B, the rich liquid 303 supplied after being split cools the lean liquid 318 discharged from the carbon dioxide release device 103 as being heated thereat. It is possible to reduce usage quantity of high temperature steam supplied at the re-boiler 108 by performing heat recovery from the lean liquid to a maximum extent. Further, it is also possible to suppress power usage quantity by reducing cooling load at the cooler 106.

The rest of the structure and operation is the same as that of the fifth embodiment and description thereof will not be repeated.

Naturally, it is also possible to provide the lean liquid cooler 123 to the carbon dioxide recovery apparatus of the sixth embodiment. Here, similar effects are obtained.

The above description is performed on examples of the first to seventh embodiments of the present invention and is not intended to limit the present invention. Modification can be performed within the technical scope of the present invention.

The invention claimed is:

1. A carbon dioxide recovery apparatus, comprising:
an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;

a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower, wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a first gas-liquid separator which separates steam from the semi-lean liquid discharged from the first carbon dioxide release device and supplies the separated steam to the second carbon dioxide release device and the separated semi-lean liquid to the regeneration tower, and a lean liquid cooler in which the second portion of the rich liquid cools lean liquid utilized in and discharged from the first carbon dioxide release device, the second portion supplied to the lean liquid cooler before being supplied to the second carbon dioxide release device.

2. A carbon dioxide recovery apparatus, comprising:

an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;

a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower, wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a second gas-liquid separator which separates the steam from the semi-lean liquid discharged from the second carbon dioxide release device and supplies the separated steam to the second carbon dioxide release device and the separated semi-lean liquid to the regeneration tower, and a lean liquid cooler in which the second portion of the rich liquid cools lean liquid utilized in and discharged from the first carbon dioxide release device, the second portion supplied to the lean liquid cooler before being supplied to the second carbon dioxide release device.

3. A carbon dioxide recovery apparatus, comprising:

an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;

a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower, wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a second gas-liquid separator which separates the steam from the semi-lean liquid discharged from the second carbon dioxide release device and supplies the separated steam to the second carbon dioxide release device and the separated semi-lean liquid to the regeneration tower, and a lean liquid cooler in which the second portion of the rich liquid cools lean liquid utilized in and discharged from the first carbon dioxide release device, the second portion supplied to the lean liquid cooler before being supplied to the second carbon dioxide release device.

4. A carbon dioxide recovery method, comprising:

generating and discharging, by an absorbing tower, a rich liquid that is rich in carbon dioxide as a result of a carbon-dioxide-containing gas contacting a carbon dioxide absorbing liquid;

discharging, by a first carbon dioxide release device, a mixture that includes semi-lean liquid and steam containing a part of carbon dioxide that is released by heating the rich liquid;

discharging, by a second carbon dioxide release device, a mixture that includes semi-lean liquid and steam containing a part of carbon dioxide that is released by heating the rich liquid;

separating, by a first gas-liquid separator, the steam from the semi-lean liquid discharged from the first carbon dioxide release device and supplying the separated steam to the second carbon dioxide release device and the separated semi-lean liquid to the regeneration tower;

heating, by a regeneration tower, the semi-lean liquid to generate a lean liquid and steam containing a remaining part of the carbon dioxide that is released and separated from the semi-lean liquid;

wherein the lean liquid that is discharged from the regeneration tower is utilized by the first carbon dioxide release device as a heat source and the steam released from the regeneration tower is utilized by the second carbon dioxide release device as a heat source; and the rich liquid discharged from the absorbing tower is split into a first portion and a second portion that are supplied respectively to the first carbon dioxide release device and the second carbon dioxide release device, splitting, by a splitting device, the rich liquid into the first portion and the second portion;

heating, by the first carbon dioxide release device, the first portion of the rich liquid with the lean liquid to generate a first mixture that includes semi-lean liquid and steam containing a part of the carbon dioxide;

heating, by the second carbon dioxide release device, the second portion of the rich liquid with the steam containing the remaining part of the carbon dioxide that is released and separated from the semi-lean liquid to generate a second mixture that includes semi-lean liquid and steam containing a part of the carbon dioxide; and combining, by a merging device, the first and second mixtures to form the mixture that is discharged.

5. A carbon dioxide recovery method, comprising:

generating and discharging, by an absorbing tower, a rich liquid that is rich in carbon dioxide as a result of a carbon-dioxide-containing gas contacting a carbon dioxide absorbing liquid;

discharging, by a first carbon dioxide release device, a mixture that includes semi-lean liquid and steam containing a part of carbon dioxide that is released by heating the rich liquid;

discharging, by a second carbon dioxide release device, a mixture that includes semi-lean liquid and steam containing a part of carbon dioxide that is released by heating the rich liquid;

separating, by a first gas-liquid separator, the steam from the semi-lean liquid discharged from the first carbon dioxide release device and supplying the separated steam to the second carbon dioxide release device and the separated semi-lean liquid to the regeneration tower;

heating, by a regeneration tower, the semi-lean liquid to generate a lean liquid and steam containing a remaining part of the carbon dioxide that is released and separated from the semi-lean liquid;

wherein the lean liquid that is discharged from the regeneration tower is utilized by the first carbon dioxide release device as a heat source and the steam released from the regeneration tower is utilized by the second carbon dioxide release device as a heat source; and the rich liquid discharged from the absorbing tower is split into a first portion and a second portion that are supplied respectively to the first carbon dioxide release device and the second carbon dioxide release device, splitting, by a splitting device, the rich liquid into the first portion and the second portion;

heating, by the first carbon dioxide release device, the first portion of the rich liquid with the lean liquid to generate a first mixture that includes semi-lean liquid and steam containing a part of the carbon dioxide; and heating, by the second carbon dioxide release device, the second portion of the rich liquid with the steam containing the remaining part of the carbon dioxide that is released and separated from the semi-lean liquid to generate a second mixture that includes semi-lean liquid and steam containing a part of the carbon dioxide, wherein the second portion of the rich liquid is used to cool lean liquid after the lean liquid is used to heat the first portion of the rich liquid.

6. A carbon dioxide recovery apparatus, comprising:

an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;

a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower, wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a first gas-liquid separator which separates steam from the semi-lean liquid discharged from the first carbon dioxide release device and supplies the separated steam to the second carbon dioxide release device and the separated semi-lean liquid to the regeneration tower, and a third gas-liquid separator which separates steam from a semi-lean liquid obtained by merging the mixture discharged from the first carbon dioxide release device and the mixture discharged from the second carbon dioxide release device and supplies the separated steam to the second carbon dioxide release device and the separated semi-lean liquid to the regeneration tower.

7. The carbon dioxide recovery apparatus according to claim 6, wherein pressure of the first gas-liquid separator or the third gas-liquid separator is set to be equal to or lower than pressure of the regeneration tower.

8. The carbon dioxide recovery apparatus according to claim 6, further comprising:
a lean liquid cooler in which the second portion of the rich liquid cools lean liquid utilized in and discharged from the first carbon dioxide release device, the second portion supplied to the lean liquid cooler before being supplied to the second carbon dioxide release device.

9. A carbon dioxide recovery apparatus, comprising:
an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;
a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and
a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower,
wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;
the rich liquid discharged from the absorbing tower is split into a first portion and a second portion that are supplied respectively to the first carbon dioxide release device and the second carbon dioxide release device; and
the carbon dioxide recovery apparatus further comprises,
a third gas-liquid separator which separates steam from a semi-lean liquid obtained from the first carbon dioxide release device and the second carbon dioxide release device and supplies the separated steam to the second carbon dioxide release device and the separated semi-lean liquid to the regeneration tower.

10. The carbon dioxide recovery apparatus according to claim 9,
wherein pressure of the third gas-liquid separator is set to be equal to or lower than pressure of the regeneration tower.

11. The carbon dioxide recovery apparatus according to claim 9, further comprising:
a lean liquid cooler in which the second portion of the rich liquid cools lean liquid utilized in and discharged from the first carbon dioxide release device, the second portion supplied to the lean liquid cooler before being supplied to the second carbon dioxide release device.

12. The carbon dioxide recovery apparatus according to claim 9,
wherein pressure of a second gas-liquid separator is set to be equal to or lower than pressure of the regeneration tower.

13. The carbon dioxide recovery apparatus according to claim 9, wherein the steam and the semi-lean liquid separated by the third gas-liquid separator are obtained by merging the mixture discharged from the first carbon dioxide release device and the mixture discharged from the second carbon dioxide release device.

14. The carbon dioxide recovery apparatus according to claim 9,
wherein pressure of the first gas-liquid separator or the third gas-liquid separator is set to be equal to or lower than pressure of the regeneration tower.

15. The carbon dioxide recovery apparatus according to claim 9, further comprising:
a cooler which cools the steam containing carbon dioxide supplied to the second carbon dioxide release device as a heat source.

16. A carbon dioxide recovery method using the carbon dioxide recovery apparatus set forth in claim 9, comprising:
generating and discharging, by the absorbing tower, rich liquid that is rich in carbon dioxide as a result of a carbon-dioxide-containing gas contacting a carbon dioxide absorbing liquid;
discharging, by the first carbon dioxide release device, in a mixture, semi-lean liquid and steam containing a part of carbon dioxide that is released by heating the rich liquid;
discharging, by the second carbon dioxide release device, in a mixture, semi-lean liquid and steam containing a part of carbon dioxide that is released by heating the rich liquid;
separating, by the third gas-liquid separator, the steam from the semi-lean liquid discharged from the first carbon dioxide release device and the second carbon dioxide release device, and supplying the separated steam to the second carbon dioxide release device and the separated semi-lean liquid to the regeneration tower; and
heating, by the regeneration tower, the semi-lean liquid to generate lean liquid and steam containing a remaining part of the carbon dioxide that is released and separated from the semi-lean liquid;
wherein the lean liquid that is discharged from the regeneration tower is utilized by the first carbon dioxide release device as a heat source and the steam released from the regeneration tower is utilized by the second carbon dioxide release device as a heat source; and
the rich liquid discharged from the absorbing tower is split into the first portion and the second portion that are supplied respectively to the first carbon dioxide release device and the second carbon dioxide release device.

17. A carbon dioxide recovery apparatus, comprising:
an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;
a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and
a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower,
wherein the carbon dioxide release device includes a first carbon dioxide release device which utilizes the lean liquid that is discharged from the regeneration tower as a heat source and a second carbon dioxide release device which utilizes the steam released from the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a first gas-liquid separator which separates the steam from the semi-lean liquid discharged from the first carbon dioxide release device and supplies the separated steam to the second carbon dioxide release device and the separated semi-lean liquid to the regeneration tower; and a second gas-liquid separator which separates the steam from the semi-lean liquid discharged from the second carbon dioxide release device and supplies the separated steam to the second carbon dioxide release device and the separated semi-lean liquid to the regeneration tower.

18. The carbon dioxide recovery apparatus according to claim 17, wherein pressure of the first gas-liquid separator is set to be equal to or lower than pressure of the regeneration tower.

19. The carbon dioxide recovery apparatus according to claim 17, further comprising:

a lean liquid cooler in which the second portion of the rich liquid cools lean liquid utilized in and discharged from the first carbon dioxide release device, the second portion supplied to the lean liquid cooler before being supplied to the second carbon dioxide release device.

20. The carbon dioxide recovery apparatus according to claim 17, wherein pressure of the second gas-liquid separator is set to be equal to or lower than pressure of the regeneration tower.

21. The carbon dioxide recovery apparatus according to claim 17, further comprising:

a third gas-liquid separator which separates steam from the semi-lean liquid obtained by merging the mixture discharged from the first carbon dioxide release device and the mixture discharged from the second carbon dioxide release device and supplies the separated steam to the second carbon dioxide release device and the separated semi-lean liquid to the regeneration tower.

22. The carbon dioxide recovery apparatus according to claim 17, wherein pressure of the first gas-liquid separator or the third gas-liquid separator is set to be equal to or lower than pressure of the regeneration tower.

23. The carbon dioxide recovery apparatus according to claim 17, further comprising:

a cooler which cools the steam containing carbon dioxide supplied to the second carbon dioxide release device as a heat source.

24. A carbon dioxide recovery method using the carbon dioxide recovery apparatus set forth in claim 17, comprising:

generating and discharging, by the absorbing tower, rich liquid that is rich in carbon dioxide as a result of a carbon-dioxide-containing gas contacting a carbon dioxide absorbing liquid;

discharging, by the first carbon dioxide release device, in a mixture, semi-lean liquid and steam containing a part of carbon dioxide that is released by heating the rich liquid;

discharging, by the second carbon dioxide release device, in a mixture, semi-lean liquid and steam containing a part of carbon dioxide that is released by heating the rich liquid;

separating, by the first gas-liquid separator, the steam from the semi-lean liquid discharged from the first carbon dioxide release device and supplying the separated steam to the second carbon dioxide release device and the separated semi-lean liquid to the regeneration tower;

separating, by the second gas-liquid separator, the steam from the semi-lean liquid discharged from the second carbon dioxide release device and supplying the separated steam to the second carbon dioxide release device and the separated semi-lean liquid to the regeneration tower; and heating, by the regeneration tower, the semi-lean liquid to generate lean liquid and steam containing a remaining part of the carbon dioxide that is released and separated from the semi-lean liquid;

wherein the lean liquid that is discharged from the regeneration tower is utilized by the first carbon dioxide release device as a heat source and the steam released from the regeneration tower is utilized by the second carbon dioxide release device as a heat source; and the rich liquid discharged from the absorbing tower is split into the first portion and the second portion that are supplied respectively to the first carbon dioxide release device and the second carbon dioxide release device.

25. A carbon dioxide recovery apparatus, comprising:

an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;

a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam being released from the regeneration tower, wherein the carbon dioxide release device includes a first carbon dioxide release device which utilizes the lean liquid that is discharged from the regeneration tower as a heat source and a second carbon dioxide release device which utilizes the steam in the regeneration tower as a heat source;

the rich liquid discharged from the absorbing tower is split into a first portion and a second portion that are supplied respectively to the first carbon dioxide release device and the second carbon dioxide release device; and the carbon dioxide recovery apparatus further comprises, a first gas-liquid separator which separates the steam from the semi-lean liquid discharged from the first carbon dioxide release device and supplies the separated steam to the second carbon dioxide release device and the separated semi-lean liquid to the regeneration tower.

26. The carbon dioxide recovery apparatus according to claim 25, wherein pressure of the first gas-liquid separator is set to be equal to or lower than pressure of the regeneration tower.

27. The carbon dioxide recovery apparatus according to claim 25, further comprising:

a lean liquid cooler in which the second portion of the rich liquid cools lean liquid utilized in and discharged from the first carbon dioxide release device, the second portion supplied to the lean liquid cooler before being supplied to the second carbon dioxide release device.

28. The carbon dioxide recovery apparatus according to claim 25,
wherein pressure of a second gas-liquid separator is set to be equal to or lower than pressure of the regeneration tower.

29. The carbon dioxide recovery apparatus according to claim 25, further comprising:
a third gas-liquid separator which separates steam from the semi-lean liquid obtained by merging the mixture discharged from the first carbon dioxide release device and the mixture discharged from the second carbon dioxide release device and supplies the separated steam to the second carbon dioxide release device and the separated semi-lean liquid to the regeneration tower.

30. The carbon dioxide recovery apparatus according to claim 25,
wherein pressure of the first gas-liquid separator or the third gas-liquid separator is set to be equal to or lower than pressure of the regeneration tower.

31. The carbon dioxide recovery apparatus according to claim 25, further comprising:
a cooler which cools the steam containing carbon dioxide supplied to the second carbon dioxide release device as a heat source.

32. A carbon dioxide recovery method using the carbon dioxide recovery apparatus set forth in claim 25, comprising:
generating and discharging, by the absorbing tower, rich liquid that is rich in carbon dioxide as a result of a carbon-dioxide-containing gas contacting a carbon dioxide absorbing liquid;
discharging, by the first carbon dioxide release device, in a mixture, semi-lean liquid and steam containing a part of carbon dioxide that is released by heating the rich liquid;
discharging, by the second carbon dioxide release device, in a mixture, semi-lean liquid and steam containing a part of carbon dioxide that is released by heating the rich liquid;
separating, by the first gas-liquid separator, the steam from the semi-lean liquid discharged from the first carbon dioxide release device and supplying the separated steam to the second carbon dioxide release device and the separated semi-lean liquid to the regeneration tower; and
heating, by the regeneration tower, the semi-lean liquid to generate lean liquid and steam containing a remaining part of the carbon dioxide that is released and separated from the semi-lean liquid;
wherein the lean liquid that is discharged from the regeneration tower is utilized by the first carbon dioxide release device as a heat source and the steam released from the regeneration tower is utilized by the second carbon dioxide release device as a heat source; and
the rich liquid discharged from the absorbing tower is split into the first portion and the second portion that are supplied respectively to the first carbon dioxide release device and the second carbon dioxide release device.

33. A carbon dioxide recovery apparatus, comprising:
an absorbing tower in which a carbon-dioxide-containing gas is introduced and contacted with an absorbing liquid that absorbs carbon dioxide, the absorbing liquid having carbon dioxide from the carbon-dioxide-containing gas absorbed therein being discharged from the absorbing tower as a rich liquid;
a carbon dioxide release device in which the rich liquid discharged from the absorbing tower is introduced and heated to generate a mixture that is discharged from the carbon dioxide release device, the mixture including a semi-lean liquid and steam, the steam containing carbon dioxide from the rich liquid; and
a regeneration tower which receives the semi-lean liquid discharged from the carbon dioxide release device and heats the semi-lean liquid to generate a lean liquid that is discharged from the regeneration tower and steam containing carbon dioxide from the received semi-lean liquid, the steam in the regeneration tower,
wherein the carbon dioxide release device includes a first carbon dioxide release device which utilizes the lean liquid that is discharged from the regeneration tower as a heat source and a second carbon dioxide release device provided in the regeneration tower as a loading layer and which utilizes the steam in the regeneration tower as a heat source;
the rich liquid discharged from the absorbing tower is split into a first portion and a second portion that are supplied respectively to the first carbon dioxide release device and the second carbon dioxide release device; and
the carbon dioxide recovery apparatus further comprises,
a first gas-liquid separator which separates the steam from the semi-lean liquid discharged from the first carbon dioxide release device and supplies the separated steam to the second carbon dioxide release device and the separated semi-lean liquid to the regeneration tower.

34. The carbon dioxide recovery apparatus according to claim 33,
wherein pressure of the first gas-liquid separator is set to be equal to or lower than pressure of the regeneration tower.

35. The carbon dioxide recovery apparatus according to claim 33, further comprising:
a lean liquid cooler in which the second portion of the rich liquid cools lean liquid utilized in and discharged from the first carbon dioxide release device, the second portion supplied to the lean liquid cooler before being supplied to the second carbon dioxide release device.

36. The carbon dioxide recovery apparatus according to claim 33,
wherein pressure of a second gas-liquid separator is set to be equal to or lower than pressure of the regeneration tower.

37. The carbon dioxide recovery apparatus according to claim 33, further comprising:
a third gas-liquid separator which separates steam from the semi-lean liquid obtained by merging the mixture discharged from the first carbon dioxide release device and the mixture discharged from the second carbon dioxide release device and supplies the separated steam to the second carbon dioxide release device and the separated semi-lean liquid to the regeneration tower.

38. The carbon dioxide recovery apparatus according to claim 33,
wherein pressure of the first gas-liquid separator or the third gas-liquid separator is set to be equal to or lower than pressure of the regeneration tower.

39. The carbon dioxide recovery apparatus according to claim 33, further comprising:
a cooler which cools the steam containing carbon dioxide supplied to the second carbon dioxide release device as a heat source.

40. A carbon dioxide recovery method using the carbon dioxide recovery apparatus set forth in claim 33, comprising:
- generating and discharging, by the absorbing tower, rich liquid that is rich in carbon dioxide as a result of a carbon-dioxide-containing gas contacting a carbon dioxide absorbing liquid;
- discharging, by the first carbon dioxide release device, in a mixture, semi-lean liquid and steam containing a part of carbon dioxide that is released by heating the rich liquid;
- discharging, by the second carbon dioxide release device, in a mixture, semi-lean liquid and steam containing a part of carbon dioxide that is released by heating the rich liquid;
- separating, by the first gas-liquid separator, the steam from the semi-lean liquid discharged from the first carbon dioxide release device and supplying the separated steam to the second carbon dioxide release device and the separated semi-lean liquid to the regeneration tower; and
- heating, by the regeneration tower, the semi-lean liquid to generate lean liquid and steam containing a remaining part of the carbon dioxide that is released and separated from the semi-lean liquid;
- wherein the lean liquid that is discharged from the regeneration tower is utilized by the first carbon dioxide release device as a heat source and the steam released from the regeneration tower is utilized by the second carbon dioxide release device as a heat source; and
- the rich liquid discharged from the absorbing tower is split into the first portion and the second portion that are supplied respectively to the first carbon dioxide release device and the second carbon dioxide release device.

* * * * *